Patented Oct. 1, 1935

2,015,676

UNITED STATES PATENT OFFICE 2,015,676

CEMENT

Harold W. Heiser, East St. Louis, Ill., assignor to Aluminum Company of America, Pittsburgh, Pa., a corporation of Pennsylvania No Drawing. Application May 5, 1932, Serial No. 609,498

5 Claims. (Cl. 106—34)

The invention relates to calcium sulfate cements which are relatively quick-setting and are of the type commonly known as Keene's cement. The invention particularly relates to the production of a quick-setting cement of this type from by-product calcium sulfate or similar material.

The calcium sulfate cements of commerce are divided broadly into two general classes, those which set very rapidly and consist substantially of the hemihydrate of calcium sulfate and those which consist of anhydrous calcium sulfate and a small amount of certain inorganic catalytic salts. Such catalytic salts are usually aluminum sulfate, potassium carbonate or sodium or potassium sulfate, and they serve the general purpose of increasing the speed of hydration of anhydrous calcium sulfate which, of itself, hydrates very slowly, if at all. The calcium sulfate used is usually substantially pure material prepared by a very careful calcination in order to obtain a product which will hydrate and which will form a cement of good crystalline structure. This type of cement, generally known as Keene's cement, requires several hours to set, but on setting it forms a very hard, rock-like mass capable of taking a high polish and very desirable for certain well known purposes.

Substantially pure calcium sulfate occurs in nature in the form of the dihydrate as the mineral gypsum which has the formula $CaSO_4.2H_2O$. Pure selected gypsum is commonly used as the starting material in the production of cements of the Keene type, and attempts which have been made to substitute for such pure gypsum the by-product calcium sulfate have, in general, proved unsuccessful. The grade of calcium sulfate required to obtain a cement which has good strength necessitates the purification of the by-product calcium sulfate. This purified product hydrates very slowly and forms calcium sulfate crystals which are quite small. Consequently the cement is of low strength and, in some cases, will not take a definite set.

It is an object of this invention to prepare a calcium sulfate cement of the Keene type which is relatively quick-setting and which, on hydration, produces a hard, strong mass capable of taking a high finish. A further object of this invention is the production of a quick-setting Keene cement having as a major constituent dead-burned by-product calcium sulfate. Other objects will be apparent from the following description of the invention.

I have discovered that if calcium sulfate in a form which is more readily hydrated than dead-burned calcium sulfate is mixed with dead-burned calcium sulfate to form the principal constituents of a Keene cement, such readily hydrated calcium sulfate will, upon subsequent hydration, form crystals which will act as a seeding material for the growth of hydrated calcium sulfate crystals from the dead-burned calcium sulfate and that the hydration of the dead-burned calcium sulfate will proceed more rapidly in the presence of these seed crystals and will form relatively large hydrated crystals to produce a cement which is hard and strong and which sets in a relatively short time. I have further found that very satisfactory quick-setting cement may be produced in this manner, using as a starting material a dehydrated calcium sulfate obtained by dead-burning the calcium sulfate which is obtained as a by-product in certain manufacturing processes, for example, in the production of phosphoric or hydrofluoric acids.

Calcium sulfate such as is obtained as a by-product in the manufacture of various acids and other products generally contains small amounts of impurities. For example, the calcium sulfate obtained from a hydrofluoric acid still usually contains from about 1 to 8 per cent of sulfuric acid and up to about 2 per cent of calcium fluoride, as well as a small amount of residual hydrofluoric acid. The presence of these impurities in the calcium sulfate renders it unsatisfactory for use in cement manufacture. The commercial method of removing these impurities is to decompose and volatilize them by calcination. The temperatures required for calcination are usually between about 400 and 1000° centigrade and the product obtained is dead-burned anhydrous calcium sulfate which will not readily hydrate by mixture with water even in the presence of the accelerating salts such as hereinabove named and generally used in the manufacture of a Keene cement. However, I have found that if in preparing such a cement the dead-burned anhydrous calcium sulfate is mixed with a more readily hydrated form of calcium sulfate and with the accelerating salts of the nature heretofore used in connection with Keene's cement, the mixture will hydrate readily and take a definite set, and the hydration will also proceed at a very rapid rate and produce a relatively quick-setting cement.

In manufacturing cements in accordance with my invention, I take dead-burned or other anhydrous calcium sulfate and mix with it an amount of a more readily hydrated calcium sulfate such as an amount of a partially hydrated calcium sulfate, preferably plaster of Paris. The plaster of Paris readily hydrates to the dihydrate. The dihydrated crystals thus formed provide nuclei for crystal growth throughout the mass. The crystal growth being definitely started in this manner lends a positive impetus to the hydration of the mass, causing it to proceed comparatively rapidly and to form a definite crystalline structure of relatively large crystals, thus producing a definite set and a relatively strong product. The amount of readily hydrated calcium sulfate, which I will refer to as seeding material, which must be added to the dead-burned calcium sulfate in order to obtain this result varies to some extent inversely with the setting time desired in the cement. When a very quick-setting cement is desired, a relatively large amount of seeding material, such as plaster of Paris, is added, and when a slower setting cement is satisfactory, a smaller amount may be used. Amounts upward of about 1 per cent of the partially hydrated calcium sulfate or seeding material produce satisfactory results, and amounts as high as 20 per cent of the total cement mixture may be used. In the preferred practice of my invention, for the production of a moderately quick-setting cement I use about 5 to 20 per cent of plaster of Paris. The remainder of the cement consists essentially of dead-burned calcium sulfate and a small amount of any of the known accelerating agents which are generally used in Keene's cement to accelerate setting. These accelerating agents are usually inorganic catalytic salts such as aluminum sulfate, potassium carbonate, or alkali metal sulfates, but as a class, they are well known and serve a definite function. In the practice of my invention, I have obtained the most satisfactory results with sodium sulfate and, in general, I prefer to use this salt. It is desirable that amounts of 0.1 to 1.0 per cent of the total weight of the cement mixture be composed of such accelerating agents. The accelerating effect, which is generally considered to be due to catalytic action, is pronounced even when minute amounts of accelerating salts are used. In usual practice I prefer to use amounts of sodium sulfate of about 0.1 to 1.0 per cent, but such limits as herein given are only restrictive in the sense that the accelerating agent or salt added is added in the proportions known to the art to produce the known effect.

As a specific example of the results which may be obtained with cement composition prepared according to my invention are cited the following experimental data. A quantity of anhydrous calcium sulfate is prepared by calcining a by-product calcium sulfate material resulting from the manufacture of hydrofluoric acid. Before calcination the material contained about 5 per cent of free sulfuric acid, a small amount of calcium fluoride and a substantial amount of residual hydrofluoric acid. The material was calcined at about 800° centigrade for an hour and a substantially pure dead-burned calcium sulfate obtained. The calcined product was ground to a fine powder and intimately mixed with 1 per cent of sodium sulfate and 5 per cent of plaster of Paris. The cement thus prepared was mixed with water to the consistency of ordinary mortar and formed into briquettes. The briquettes took an initial set in about 4 hours and a final set in about 24 hours. After being aged for 4 days in a moist atmosphere and after 1 day's drying, the briquettes had a tensile strength of about 400 pounds per square inch. When a cement of this type was prepared from a calcined by-product calcium sulfate with the addition of 5 per cent plaster of Paris and no accelerating salt, the cement did not take a satisfactory set. Likewise, when an accelerating agent such as sodium sulfate was alone added to the calcined by-product calcium sulfate and no plaster of Paris or similar material was added, the cement did not take a satisfactory set.

Having thus described my invention and explained the method in which it may be practiced, I claim:

1. As a cement, a mixture consisting of dead-burned by-product calcium sulfate and partially hydrated calcium sulfate and a substantially acid-free catalytic hydration accelerating substance.

2. As a cement, a mixture consisting of dead-burned by-product calcium sulfate and a lesser quantity of a calcium sulfate more readily hydrated than dead-burned by-product calcium sulfate and a catalytic hydration accelerating substance selected from the group of substantially non-acidic salts comprising aluminum sulfate, potassium carbonate and alkali metal sulfates.

3. As a cement, a mixture consisting of dead-burned by-product calcium sulfate, about 1 per cent to 20 per cent by weight of plaster of Paris and a small amount of a substantially non-acidic catalytic hydration accelerating substance.

4. As a cement, a mixture consisting of dead-burned by-product calcium sulfate and about 5 per cent to 20 per cent by weight of plaster of Paris and a small amount of sodium sulfate.

5. A method of making cement from by-product calcium sulfate which comprises the steps of removing impurities by dead-burning the by-product calcium sulfate, and adding thereto partially hydrated calcium sulfate seed crystals and a catalytic hydration accelerating substance.

HAROLD W. HEISER.